June 28, 1949.  S. W. WARNER  2,474,340
FLOATING ELECTRODE
Filed Jan. 15, 1948
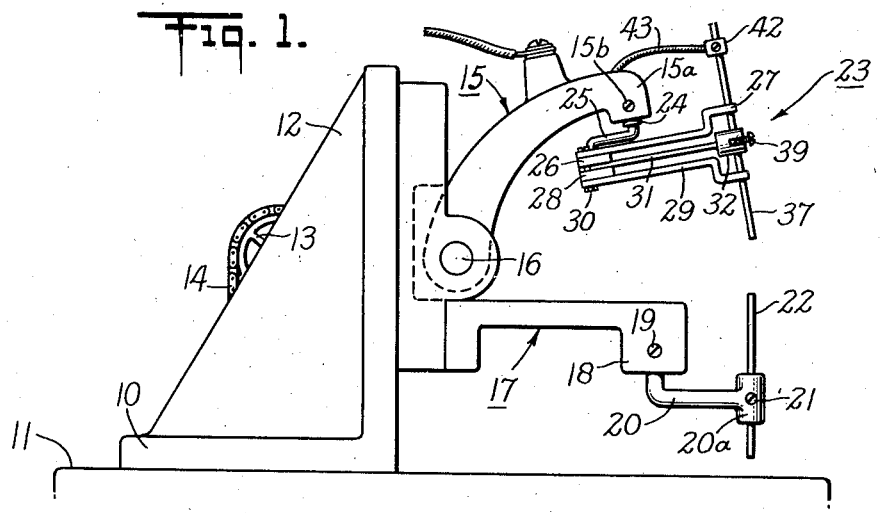
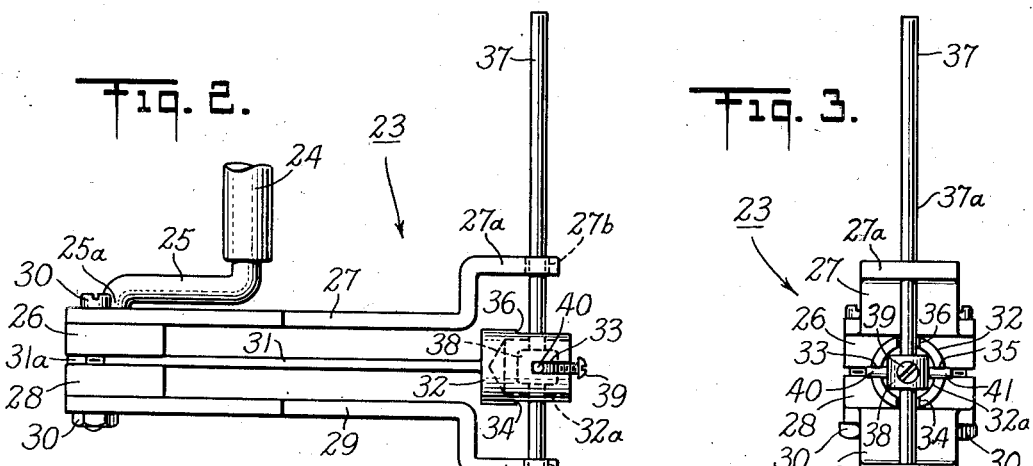
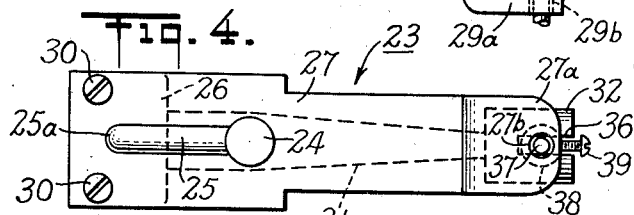
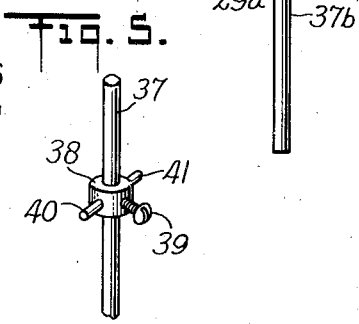
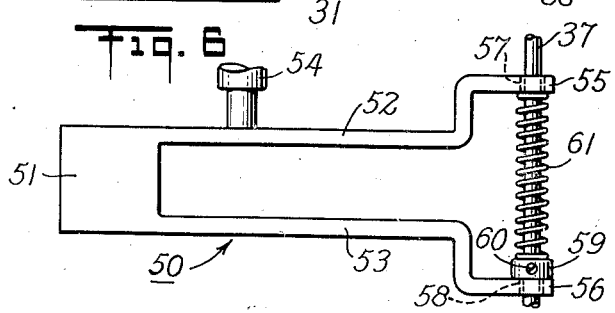
INVENTOR
Samuel W. Warner
BY
Blair, Curtis & Hayward
ATTORNEYS Patented June 28, 1949

2,474,340

UNITED STATES PATENT OFFICE 2,474,340

FLOATING ELECTRODE

Samuel W. Warner, Newark, N. J.

Application January 15, 1948, Serial No. 2,373

12 Claims. (Cl. 219—4)

This invention relates to electric welding apparatus and more particularly to an improved electrode for such apparatus.

Spot welding apparatus is now in wide use among a diversity of manufacturers of different products. Such apparatus varies in size from small spot welders such as are widely used in the manufacture of radio tubes and the like to large units adapted for joining heavier structural or conducting elements. Regardless of welder or work size, however, or indeed the chemical structure of the metal being welded, it is important that where two metallic members are to be fused together the joint be a lasting one that is capable of withstanding forces tending to separate them.

Many spot welding devices are characterized by relatively movable electrodes, one of which is swingable through an arc toward the stationary other electrode so as to clamp the work therebetween. In such apparatus the path of movement of the movable electrode is fixed, i. e. it must of necessity have a fixed radius of movement from which it cannot deviate because of its inherent rigidity and that of the associated mechanism to which it is attached and by which it is transported between operative and inoperative positions. Thus when such an electrode is swung into welding position wherein it engages one side of the workpiece and forces the work against the fixed electrode, any further movement of the movable electrode must be circular as dictated by its normal radius of movement. Thus when the welding current passes from one electrode to the other through the work and the metal is welded, there results a lateral displacement between the two electrodes in addition to the further movement of the movable electrode toward the fixed one. The resultant of these relative movements is such that a smearing action ensues, i. e. the metal of the two workpieces being welded is surface smeared together in the nature of two pieces being pasted together, because as the two workpieces being welded fuse there is a lateral bias imposed on one of them because of the relative lateral movement of the movable electrode whose arc of movement is fixed. Thus instead of one workpiece being welded or embedded into the other—to make a tight joint—it is smeared across the other being held thereto by no more than a surface fusion of metal that is prone to tear loose from forces that would not impair a proper weld, as where one metal is actually embedded in the other.

Conventional welding apparatus such as that with which I am familiar has another inherent shortcoming. For example, a conventional bench type spot welder has a fixed arm and a movable arm that may be swung toward and away from the fixed arm as by a foot treadle. These arms each have an electrode mounted therein. The movable arm has substantial mass, and accordingly inertia. Thus when it is swung down to a position wherein its electrode, which is rigidly fastened thereto, engages the work, any further movement of such electrode must of necessity be accompanied by the same amount of movement of the arm. Now the only force that can impart such movement to the arm is the pressure of the treadle loaded spring or springs, but this pressure is insufficient to overcome with sufficient rapidity the inertia of the arm. Hence when the welding current momentarily softens the metal of the work to a fusible degree, there is insufficient time during the period between the softening and hardening of the metal for the spring pressure to overcome the arm inertia and exert an embedding pressure on the upper workpiece 50 as to embed it into the lower one. Any driving force as may be exerted by the spring pressure during the welding period is to a substantial extent dissipated in causing lateral displacement of the two workpieces as noted above, and the surface or smear weld between the workpieces results. This effect is particularly evident on small parts, as for instance in the assembly of radio tubes, and results in many defective tubes and subsequent tube failures during use, particularly where the tube is subject to vibration.

There is still another disadvantage inherent in conventional welding apparatus, particularly of the lighter types. In such apparatus, each electrode is rigidly secured to its respective arm and accordingly must be adjusted with rather nice accuracy with respect to the thickness of the work if a proper weld is to be obtained. Over a protracted period of use, electrode wear at the welding point will occur, thus necessitating readjustment of the electrodes. But before the necessity for such readjustment becomes apparent, a number of poor welds might well be made. In any event, such readjustment necessitates an idle period in the use of the machine which is, of course, costly in mass production technique.

It is accordingly among the objects of my invention to provide improved welding apparatus which overcomes the aforementioned shortcomings in addition to others in a thoroughly practical and efficient manner.

In accordance with one form of my invention, the movable arm of an otherwise conventional welding apparatus has detachably secured thereto what I shall hereinafter refer to as a floating electrode. This device includes a pair of substantially rigid arms which are detachably secured to the movable arm of the welding machine. Between these rigid arms is secured one end of a resilient leaf, the other end of which rockably mounts a collar in which an electrode rod is adjustably carried. The ends of this rod project respectively through holes in the free ends of the rigid arms so that when the movable arm of the welder is raised, the lower end of the movable electrode rod is spaced above the upper end of the fixed electrode. Thus when the welder arm is swung down as by a foot treadle, the movable electrode engages the work reposing on the fixed electrode. Any further downward movement of the movable arm merely flexes the leaf of the floating electrode and does not displace the movable electrode rod laterally of the fixed electrode. Thus when the current is turned on and the metal of the work softens and fuses, the movable electrode rod is driven only axially by its leaf and not laterally of the fixed electrode, thus forcing the upper workpiece into the lower, and not moving them laterally as would smear the weld.

In the drawing wherein I have shown one form of my invention,

Figure 1 is a schematic side view of a conventional bench welder having my floating electrode installed therein;

Figure 2 is an enlarged side view of the floating electrode;

Figure 3 is an end view of the electrode;

Figure 4 is a top plan view of the electrode;

Figure 5 is a perspective view of the electrode rod and its mounting collar; and, Figure 6 is a side elevation of a modified form of my floating electrode.

Similar reference characters refer to similar parts throughout the views of the drawing.

Referring first to Figure 1, the conventional bench type spot welder illustrated includes a base 10 adapted to be fastened to a bench top 11. Extending upwardly from base 10 is a column 12 on which a chain pulley 13 is rotatably mounted. A chain 14 is trained around this pulley and runs downwardly through base 10 and bench top 11 to a foot treadle (not shown) to which it is secured. The other end of chain 14 is secured to a spring biased lever system (not shown) which system is in turn operatively associated with an arm generally indicated at 15. This arm is pivotally mounted on a shaft 16 carried by column 12. Thus when the aforementioned foot treadle (not shown) is depressed, chain 14 is drawn downwardly. The chain acting through the spring and lever system (not shown) resiliently forces arm 15 clockwise about shaft 16.

The welder also includes a stationary arm generally indicated at 17 which is fastened in any suitable manner to column 12. On the extremity of this arm is a fitting 18 in which is detachably secured as by a set screw 19 an electrode support or holder 20. The end 20a of holder 20 detachably supports, as by a set screw 21, a fixed lower electrode 22. Thus it may be seen that the horizontal and vertical positions of the lower electrode 22 may be determined and set by adjusting holder 20 and electrode 22 in fitting 18 and holder end 20a respectively. It should be noted that holder end 20a is so made that when electrode 22 is adjusted and set, the axis of the lower electrode is vertical, the surface of the upper end of the electrode being horizontal and constituting a work support.

Movable arm 15 of the welder detachably carries an upper electrode generally indicated at 23. This is the floating electrode which is primarily the subject of my invention. Electrode 23 includes an upwardly projecting stud 24 (Figure 2) which is a relatively heavy and rigid supporting member detachably received in the end 15a (Figure 1) of welder arm 15, wherein it is held by a set screw 15b.

Stud 24 is preferably an integral part of a goose neck 25, having a downwardly extending end 25a which may be brazed to a block 26. Fastened to or integral with block 26 is an arm or guide 27, both of which may be a rigid member comprising, if desired, a bronze casting. A similar block 28 and an arm 29 constitute the lower supporting portion of electrode 23. Between these castings is secured as by bolts 30 the inner end 31a of a resilient carrier 31. The outer end of this carrier has fastened thereto an annular fitting 32 which is disposed between the flanged ends 27a and 29a respectively of rigid guides 27 and 29.

Pausing for a moment, carrier 31 may be formed of any suitable material that is springy and capable of resuming its original form after being subjected to a deflecting force. It should have sufficient rigidity to maintain a neutral horizontal position between guides 27 and 29, without sagging while at rest.

As noted above, carrier 31 has fastened to its outer end fitting 32. This fitting may be a screw machine piece bored and milled to include an opening 32a (Figure 3) and quadratured slots 33, 34, 35 and 36. Guide flanges 27a and 29a are respectively drilled at 27b and 29b and through these two holes extends an electrode rod 37. The diameter of holes 27b and 29b is greater than that of electrode rod 37 by a few thousandths of an inch, for a purpose that will be pointed out hereinbelow.

Electrode 37 extends through and is adjustably fastened to a collar 38 as by a set screw 39. The upper and lower ends 37a and 37b of electrode 37 extend respectively through upper fitting slot 36 and upper guide flange hole 27b on the one hand, and lower fitting slot 34 and lower guide flange hole 29b on the other hand. As shown in Figures 3 and 5, electrode supporting collar 38 has a pair of oppositely extending pins 40 and 41 secured thereto, and these pins, as shown in Figure 3, rest in fitting slots 33 and 35 respectively, thereby rockably supporting electrode 37 in fitting 32.

As noted above, holes 27b and 29b exceed by a few thousandths of an inch the diameter of electrode 37, and to the extent of this misfit, the electrode can rock about the axis of its supporting pins 40 and 41 relative to guide flanges 27a and 29a. This movement is, however, quite limited so that the total amount of movement of which electrode 39 is capable laterally of fixed electrode 37 is negligible say of the order of a thousandth of an inch or less. In other words, the diameter of holes 27b and 29b exceeds that of electrode 37 by an amount only sufficient to provide a free sliding fit between the upper and lower ends of the electrode and their respective guide flanges.

The upper end of electrode 37 (Figures 1 and 2) may detachably carry a collar 42, to which a lead wire 43 is fastened, this wire being connected in any suitable manner to the secondary of the welder transformer (not shown).

In operation, the operator depresses a foot treadle or whatever motive means are employed, to swing the welder arm 15 clockwise about the axis of shaft 16. When the lower end of electrode 37 engages the upper end of the fixed electrode 22, continued clockwise movement of arm 15 causes the resilient electrode carrier 31 to flex. It is the pressure exerted by the resilience of carrier 31 which forces electrode 37 against the work that is to be welded. It should be noted at this point that this pressure may be varied by adjusting electrode 37 in collar 38, when electrodes 37 and 22 are axially aligned, with the work clamped therebetween. Guides 27 and 29 are substantially horizontal so that any subsequent movement of electrode 37 is constrained to the vertical, i. e. electrode 37 cannot move laterally of lower electrode 22. Thus when the current passes through the electrodes and the work, the sudden liquefaction of the work as the metal melts, permits axial movement of electrode 37 relative to lower electrode 22. This desired movement of the electrode is effected by reason of the pressure of resilient carrier 31, which was flexed, as described above, and as the mass of fixture 32 and electrode 37 is so slight, there is but little inertia to overcome, and accordingly there is ample time for this electrode movement to take place, in spite of the short duration of the period during which the metal work is liquid at the welding point. Unless pressure is exerted on the electrode 37 continuously during the transition of the metal from its solid state to liquid, burning or flashing out of both the work and the electrode will occur at the weld. Such flashing out, of course, spoils the electrode, as it causes oxidation and pitting thereof, necessitating removal and redressing of the electrode. Of course, such burning or flashing out spoils the work about the area of the weld.

In Figure 6 I have shown a modified form of my floating electrode, noting at the outset that it acts precisely in the same manner, and attains the same results as the floating electrode shown in Figures 1–5, and described hereinabove.

Referring now to Figure 6, the modified form of my floating electrode is generally indicated at 50 and includes a relatively heavy, rigid support 51 comprising upper and lower guides 52 and 53. Upper guide 52 has secured thereto in any suitable manner a mounting post 54, which may be detachably secured to welder arm 15 (Figure 1). The ends of guides 52 and 53 are flanged respectively at 55 and 56, and as indicated by the drawing, comprise an integral piece, which is preferably a bronze casting.

Flanges 55 and 56 are drilled, respectively, to provide holes 57 and 58, in which electrode 37 is slidably mounted. The diameter of these holes is larger than that of electrode 37 only by an amount sufficient to provide a free sliding fit for the electrode in the guide flanges.

A collar 59 is adjustably secured to electrode 37, as by a set screw 60, and a coil spring 61 is coiled about the electrode between collar 59 and upper flange 55. This spring accordingly constantly biases electrode 37 downwardly.

It may now be seen that when floating electrode 50 is swung downwardly in the manner hereinbefore described, by clockwise movement of welder arm 15, the bottom of electrode 37 ultimately engages the metal work which is resting on the upper end of the lower electrode 22. As movement of welder arm 15 continues, electrode guides 52 and 53 continue to move downwardly, electrode 37, of course, being held stationary. This compresses springs 61, i. e. loads the spring by an amount determined by the setting of collar 56, inasmuch as the upper guide flange 55 presses downwardly on the top of the spring. Hence when the metal work softens, upon the passage of current through the electrodes, the pressure of spring 61 acting against collar 59 forces electrode 37 downwardly, thus exerting the desired continuous pressure on the work during the transition of the metal from its solid state to its liquid state, as described hereinbefore.

Thus it may be seen that I have provided a floating electrode which attains the several objects set forth hereinabove in a thoroughly efficient and practical manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In welding apparatus, in combination, a fixed support having an electrode mounted thereon, a shaft, a second support mounted on said shaft for movement about the axis thereof, power mechanism for moving said second support in an arc toward said fixed support, a resilient arm attached to and movable with said movable support, an electrode carried by and movable with said resilient arm into axially aligned engagement with said fixed electrode, whereby when said movable support is swung toward said fixed support, the opposed ends of said electrodes clamp between them the pieces to be welded, and said resilient arm is somewhat flexed thereby to drive said second electrode toward said first electrode axially thereof when the metal being welded softens without the necessity of moving said movable support to effect such movement of the movable electrode, and a guiding device secured to and carried by said movable support, said movable electrode slidingly engaging said device as to be constrained thereby to substantially axial movement only relative thereto.

2. Welding apparatus in accordance with claim 1, wherein said guiding device includes a rigid arm fastened at its inner end to said movable support and extending outwardly of the arc of movement of said movable support, the electrode guiding portion of said device being adjacent its outer end.

3. Welding apparatus in accordance with claim 1, wherein said guiding device comprises two spaced rigid arms fastened at their inner ends to said movable support and extending outwardly of the arc of movement of said movable support, the electrode guiding portion of said device being adjacent their outer ends.

4. In welding apparatus, in combination, a fixed support having an electrode mounted thereon, a shaft, a second support mounted on said shaft for movement about the axis thereof, power mechanism for moving said second support in an arc toward said fixed support, a resilient arm attached to and movable with said movable support, an electrode carried by and movable with said resilient arm into axially aligned engagement with said fixed electrode, whereby when said movable support is swung toward said fixed support, the opposed ends of said electrodes clamp between them the pieces to be welded, and said resilient arm is somewhat flexed thereby to drive said second electrode toward said first electrode axially thereof when the metal being welded softens without the necessity of moving said movable support to effect such movement of the movable electrode, said resilient arm having a collar mounted on its extremity, said movable electrode extending through said collar, and an element on said collar for adjustably securing said electrode thereto.

5. In welding apparatus, in combination, a fixed support having an electrode mounted thereon, a shaft, a second support mounted on said shaft for movement about the axis thereof, power mechanism for moving said second support in an arc toward said fixed support, an electrode carrier carried by and movable with said movable support and having a normal position of rest relative to said movable support and including means biasing it, i. e. said carrier, towards said normal position, and an electrode mounted on said carrier and movable therewith into axially aligned engagement with said fixed electrode, whereby when said movable support is swung toward said fixed support, the opposed ends of said electrodes clamp between them the pieces to be welded, and said resilient arm is somewhat flexed thereby to drive said second electrode toward said first electrode axially thereof when the metal being welded softens without the necessity of moving said movable support to effect such movement of the movable electrode.

6. In welding apparatus, in combination, a fixed support having an electrode mounted thereon, a shaft, a second support mounted on said shaft for movement about the axis thereof, power mechanism for moving said second support toward said fixed support, a rigid electrode carrier mounted on and movable with said movable support, an electrode movably mounted on said electrode carrier, and a spring member having one end engaging said carrier and the other end engaging said electrode, whereby when said movable support is swung toward said fixed support the opposed ends of said electrodes clamp between them the pieces to be welded and said spring is somewhat flexed, i. e. loaded, thereby to drive said second electrode toward said first electrode when the metal being welded goes into liquid state, without the necessity of moving said movable support to effect such movement of the movable electrode.

7. Apparatus in accordance with claim 6, wherein said carrier includes a rigid arm having a guide portion and said electrode includes a rod slidably mounted in said guide portion.

8. As an article of manufacture, a pair of spaced rigid supporting and guiding arms adapted to be detachably secured to the movable support of a welding machine, an electrode movably mounted on said guiding arms, and an elongated leaf spring having one end bearing on said electrode and its other end fastened to said guiding arms to bias said electrode in one direction when it is flexed.

9. In welding apparatus, in combination, a pair of rigid supporting and guiding arms forming a generally U-shaped structure, the ends of said arms having guide holes therein, an electrode slidably mounted in said guide holes, and an elongated leaf spring having one end loosely connected to said electrode and its other end fastened to the base of said U, thereby to bias said electrode in one direction when it is flexed in the opposite direction.

10. In welding apparatus, in combination, a support, an electrode mounted on said support, a second support having inner and outer ends, a second electrode mounted on the outer end of said second support, means mounting the inner end of said second support so that its outer end may move toward and from said first support, said second support comprising a flexible spring arm, and means to move the outer end of said spring arm toward said first support, whereby when a workpiece is clamped between said electrodes said spring arm is flexed.

11. Apparatus according to claim 10 wherein said second electrode comprises an elongated rodlike element extending through the outer end of said spring arm, and means for fixing said element in an axially adjusted position relative to said outer end.

12. Apparatus according to claim 10 wherein said second electrode comprises an elongated rodlike element extending through the outer end of said spring arm, and means for fixing said element in an axially adjusted position relative to said outer end, while precluding rotation of said element relative to said spring arm.

SAMUEL W. WARNER.

REFERENCES CITED

The following references are of record in the file of this patent:

UNITED STATES PATENTS

| Number | Name | Date |
|---|---|---|
| 1,536,838 | Geisenhoner | May 5, 1925 |
| 2,231,617 | Eisler | Feb. 11, 1941 |
| 2,276,770 | Green | Mar. 17, 1942 |
| 2,452,010 | Woodward | Oct. 19, 1948 |